United States Patent Office 3,346,118
Patented Oct. 10, 1967

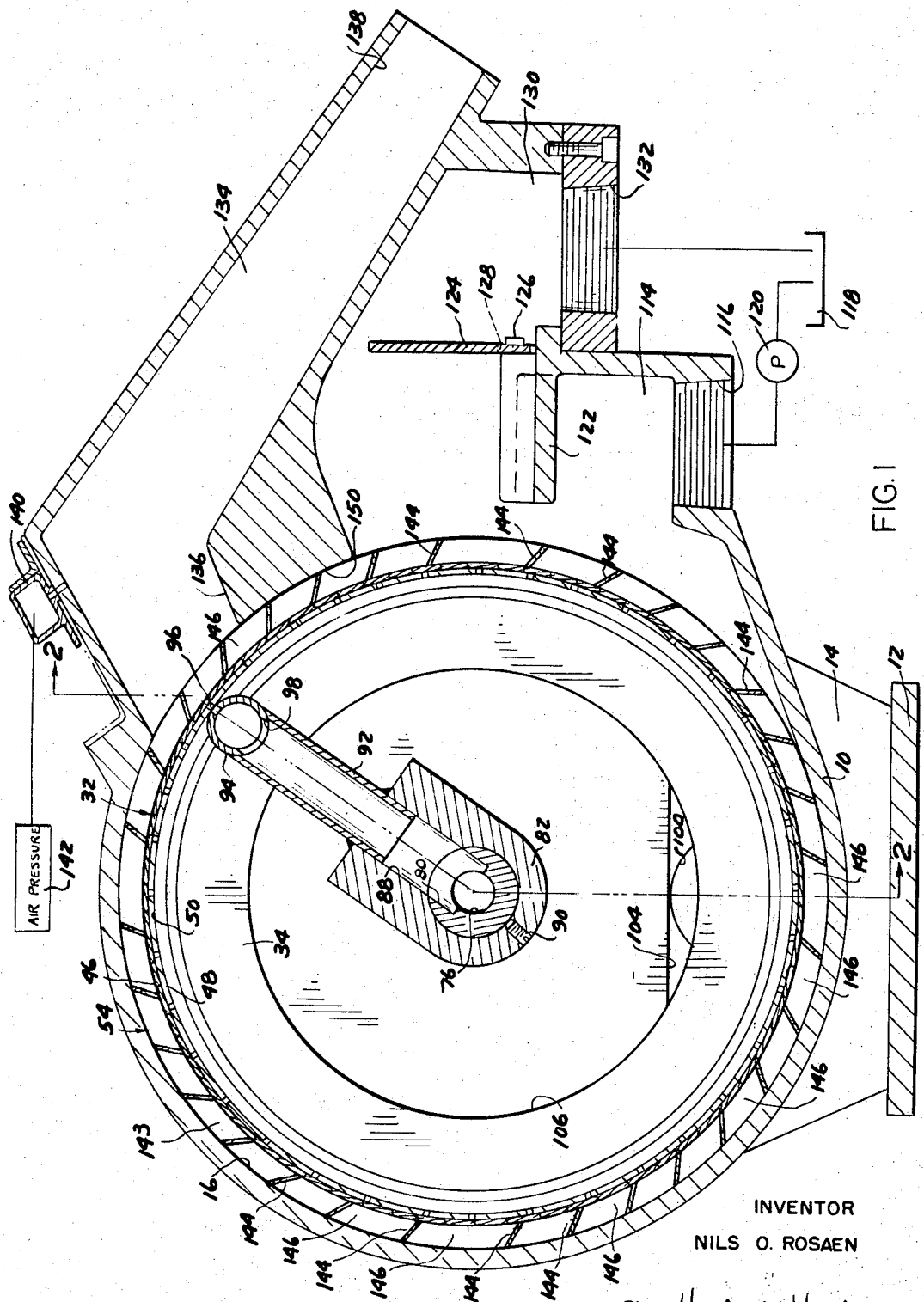

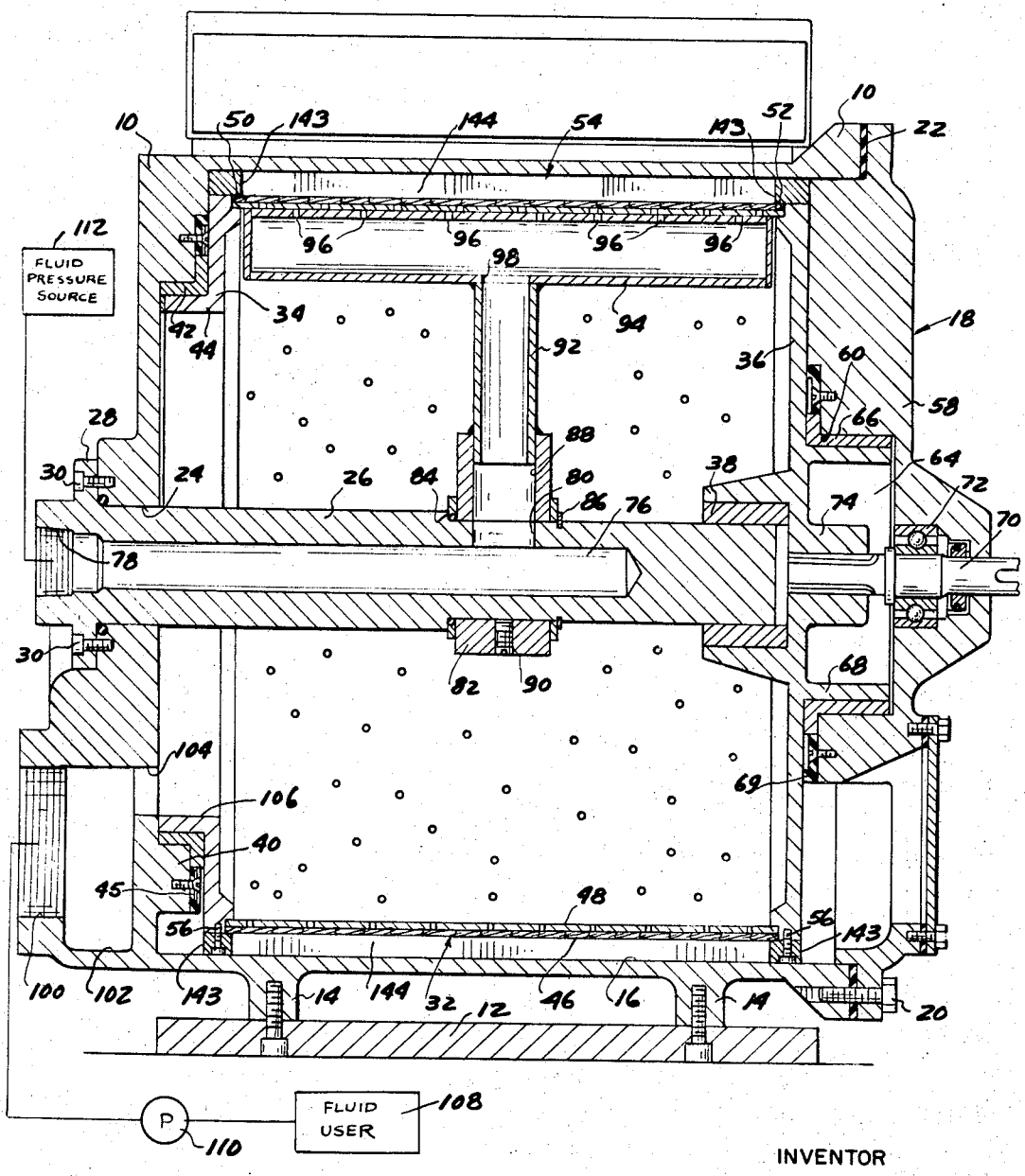

3,346,118
CONTINUOUS FILTER SYSTEM
Nils O. Rosaen, Bloomfield Hills, Mich., assignor of one-third to Oscar E. Rosaen, Grosse Pointe, and one-third to Borje O. Rosaen, Ann Arbor, Mich.
Filed May 17, 1965, Ser. No. 456,401
5 Claims. (Cl. 210—391)

ABSTRACT OF THE DISCLOSURE

A filter device with a rotatable filter assembly, means for limiting the level of fluid in the device, a vane assembly for sealing portions of the filter device from each other to prevent particle escape from and entry of air into the system and means for directing air through the filter element in a reverse direction for cleaning.

---

The present invention relates to fluid filtering systems, particularly to those filtering systems in which means are provided for cleaning the filter element in place and more particularly to a filter device for such systems in which means are provided for insuring that the foreign particles tending to clog the filter element will be removed from the fluid system during the cleaning cycle.

Heretofore many attempts have been made to provide a filter device which can be continuously operated without interruption for purposes of cleaning or replacing the filter element. One common method of producing such a filter device is to provide means for rotating the filter element and directing a reverse flow of fluid through a portion of the element as it is being rotated. The problem with such filter devices has heretofore been that a large portion of the foreign matter which is dislodged from the filter element during the cleaning cycle either by the rotation of the element or the reverse flow of fluid remains within the system on the inlet side of the filter element. Because of this, after the filter device has been in use for some time, the cleaning cycles must be repeated at more frequent intervals and at some point cleaning does little good because the element almost immediately becomes clogged again.

The present invention provides such a filter device having means tending to prevent the foreign particles which clog the filter element from being returned to the fluid system. A cylindrical filter element is provided and is mounted within a filter housing to be rotated about a substantially horizontal axis. Means are provided for maintaining a working fluid in the housing at a level below at least a portion of the filter element and means are provided for directing a reverse flow of fluid through that portion of the filter element above the working fluid and out of the filter housing. To prevent foreign particles from falling off the element as it is being rotated a plurality of annularly spaced and longitudinally extending vane elements are disposed on the exterior or inlet surface of the filter element. The vane elements divide the inlet side of the filter element into a plurality of contaminant retaining compartments and the reverse flow of fluid is directed through each of these individual compartments in turn.

It is an object then of the present invention to improve filtering systems by providing a filter device for such systems having a new means for cleaning the filter element of the filter device in place.

It is another object of the present invention to improve self cleaning filter devices by providing means insuring that the foreign particles dislodged from the filter element during the cleaning cycle will be carried out of the system.

It is yet another object of the present invention to improve self cleaning filter devices by providing such a device having a substantially cylindrical filter element, means for mounting the filter element to rotate within a filter housing on a horizontal axis, means maintaining the level of fluid within the housing below at least a portion of the filter element, means directing a reverse flow of fluid through the upper portion of the filter element, and a plurality of axially extending vane elements disposed on the inlet side of the filter element and dividing the inlet side of the element into a plurality of contaminant retaining compartments.

Still further objects and advantages of the present invention will readily occur to one skilled in the art to which the invention pertains upon reference to the following drawings in which like reference characters refer to like parts throughout the several views and in which FIG. 1 is a lateral cross-sectional view of a preferred filter device of the present invention and with portions of a preferred fluid system shown diagrammatically, and FIG. 2 is a cross sectional view taken substantially on line 2—2 of FIG. 1 and illustrating portions of a preferred fluid system diagrammatically.

Now referring to the drawings for a more detailed description of the present invention a preferred filter device is illustrated as comprising a housing member 10 supported by a base 12 and spaced legs 14. The housing 10 defines a substantially cylindrical filter chamber 16 closed at one end by an end cap assembly 18 secured to the housing 10 by a plurality of screws 20. A gasket 22 is positioned intermediate the housing 10 and the end cap assembly 18.

The housing 10 is provided with a central axially positioned opening 24 disposed opposite the end cap assembly 18 as can best be seen in FIG. 2. A shaft 26 is provided with a radially enlarged portion 28 which provides the means for mounting the shaft 26 by means of screws 30 to extend through the opening 24 and axially into the filter chamber 16.

A filter assembly generally indicated at 32 preferably comprises a pair of axially spaced annular members 34 and 36. The annular member 36 is rotatably supported on the free end of the shaft 26 by bushing 38. The housing 10 is provided with an annular flange 40 disposed on the inner wall of the housing 10 opposite the end cap assembly 18. The annular member 34 is rotatably supported by the housing 10 by means of a bushing 42 disposed between the flange 40 and an axially extending annular flange portion 44 of the annular member 34. A seal 45 prevents fluid leakage between the flange portion 44 and the flange 40.

The filter assembly 32 preferably further comprises a cylindrical filter element 46 sandwiched between the annular members 34 and 36 and a perforated cylindrical support member 48 disposed within the filter element 46. The filter element 46 and the support member 48 are fixed in position in aligning annular recesses 50 and 52 provided in the annular members 34 and 36 respectively by a vane assembly 54 which overlies the filter element 46 and which is fixed to the annular members 34 and 36 by screws 56.

The end cap assembly 18 preferably comprises an end cap 58 having an axial inner recess 60. The recess 60 defines a cylindrical axial cavity 64. The annular member 36 of the filter assembly 32 is rotatably supported by the end cap 58 by means of a bushing 66 disposed intermediate the inner surface defining the recess 60 and an axially extending flange portion 68 of the annular member 36. A seal 69 prevents fluid leakage between the end cap 58 and the annular member 36.

A drive shaft 70 is rotatably supported by bearings 72 mounted in the end cap 58 and extends axially through the recess 60 and the cavity 64. The free end of the shaft 70 is splined and is received by an internally splined boss portion 74 of the annular member 36 so that rotation of the drive shaft 70 by driving means (not shown) produces rotation of the filter assembly 32.

The shaft 26 is provided with an axial passage 76 registering at one end with a port 78 and near the opposite end with a radial passage 80. A support member 82 is mounted in axial position on the shaft 26 by means of a shoulder portion 84 formed on the outer surface of the shaft 26 and a snap ring 86. The support member 82 is provided with a passage 88 and is locked in position with the passages 80 and 88 in registry by a screw 90. A tubular member 92 extends from the passage 88 and is secured to the support member 82 to extend radially therefrom as can best be seen in FIG. 1. The free end of the tubular member 92 supports a transverse tubular member 94 in a position adjacent and extending along the axial length of a portion of the perforated support member 48 of the filter assembly 32. The portion of the tubular member 94 adjacent the support member 48 is provided with axially spaced orifices 96 and the interior of the tubular member 94 is open to the interior of the tubular member 92 through an opening 98.

As can best be seen in FIG. 2 the housing 10 is provided with an outlet 100 opening to the interior of the filter assembly 32 through a chamber 102 and a port 104 provided in the housing 10 and a central opening 106 in the annular member 34 defined by the flange 44. The outlet 100 is connected to a fluid user 108 through a pump 110. The port 78 is connected to a source of fluid pressure 112.

As can best be seen in FIG. 1, the housing 10 is formed to provide an inlet chamber 114 open to the filter chamber 16 and connected to an inlet 116. The inlet 116 is connected to a fluid reservoir 118 through a pump 120. An inner wall portion 122 extends partially across the inlet chamber 114 and provides the means for supporting a vertical wall member 124. The height of the wall member 124 is adjustable by means of a screw 126 and a vertical slot 128. The wall member 124 separates the inlet chamber 114 from a spill chamber 130. The spill chamber 130 is connected to the reservoir 118 by a spill port 132.

The housing 10 is also formed to provide a cleaning passage 134 which registers with the filter chamber 16 through an axially extending opening 136 disposed closely adjacent and overlying the tubular member 94. The cleaning passage 134 angles slightly upwardly and then downwardly to terminate in a port 138. A nozzle member 140 is preferably carried in the housing 10 near the juncture of the upwardly and downwardly extending portions of the cleaning passage 134 to direct air downwardly through the passage 134. The nozzle member 140 is connected to a source of air pressure 142.

The vane assembly 54 preferably comprises a pair of annular members 143 secured to the annular members 34 and 36 of the filter assembly 32 by the screws 56 and a plurality of annularly spaced axially extending vane members 144 extending between the members 143 and dividing the inlet surface of the filter element 46 into a plurality of axially extending compartments 146.

As can best be seen in FIG. 2 in the area from adjacent the inlet chamber 14 to the opening 136 the vanes 144 engage the inner surface of the housing member 10 so that the compartments are substantially fluid tight. A portion 150 of the housing 10 disposed below the opening 136 engages with the vanes 144 as shown in FIG. 1.

Fluid is pumped from the reservoir 118 by the pump 120 to the inlet chamber 114 and the filter chamber 16. The pump 110 draws the fluid from the filter chamber 16 radially inwardly through the filter element 46 axially through the opening 106, the port 104 and the outlet 100 to deliver filtered fluid to the fluid user 108.

The wall 124 is adjusted to maintain the level of fluid in the filter chamber 16 at a desired level with the upper portion of the filter assembly 32 above the level of fluid. When the fluid in the chamber 16 exceeds the desired level. it rises above the upper edge of the wall 124 and spills over into the chamber 130 and is returned to the reservoir 118 through the port 132.

When it is desired to clean the filter element 46 the shaft 70 is rotated to rotate the filter assembly 32. As the filter assembly 32 is being rotated, fluid under pressure is delivered from the source 112 through the passages 76 and 80 in the shaft 26 and through the tubular members 92 and 94 where it is ejected through the orifices 96 through a constantly changing portion of the filter element 46. The fluid is ejected through the element 46 in a direction reverse to the normal flow through the element 46 so that foreign particles tending to clog the element 46 are dislodged from the inlet side thereof and directed into the inlet 136 and through the passage 134 and the outlet 138 to be removed from the fluid system. To aid in directing the foreign particles through the passage 134 the air nozzle 140 can be actuated.

Because that portion of the filter element 46 which is being cleaned is disposed above the level of the working fluid there is little chance for the foreign particles to find their way back into the system fluid. Further, the vane assembly 54 aids in preventing this and aids in insuring that all of the contaminant on the inlet side of the element 46 will be removed from the system through the passage 134. Fluid forced from the element as the element is being rotated and as portions of the element are being moved out of the system tends to dislodge some of the foreign particles and would ordinarily tend to carry these particles back into the system fluid. The vane elements 144 engaging with the inner wall of the housing 10 as the filter assembly 32 is being moved from the inlet chamber 114 to the opening 136 tend to collect the contaminants within the compartments 146 and retain them there until they are forced into the passage 134. Further, the vane elements 144 in combination with the portion 150 of the housing 10 confine the reverse fluid to a specific area so that its full force is used to clean the element.

It is apparent that because of the cleaning action is produced in an area remote from and above the system fluid any fluid including air can be used for the cleaning fluid. The problem with using air for such purposes is the danger of it becoming mixed with the working fluid. There is little danger of this in the filter device of the present invention.

It is also apparent that although I have described but one embodiment of my invention many changes and modifications can be made therein without departing from the spirit of the invention as expressed by the appended claims.

I claim:
1. A continuous filter device for filtering solids from liquids, said device comprising:
  (a) a filter housing having an inner wall defining a substantially cylindrical and substantially closed filter chamber and said housing having an inlet and an outlet open to said filter chamber,
  (b) a substantially cylindrical filter element disposed in said filter chamber intermediate said inlet and said outlet,
  (c) means directing fluid from said inlet radially inwardly through said filter element and axially through said filter element to said outlet,
  (d) means rotating said filter element on a horizontal axis,
  (e) means disposed within said filter element for directing a second flow of fluid from the interior thereof radially outwardly through said filter element,
  (f) means limiting the level of fluid within said filter chamber to a level below a portion of said filter element and above said inlet and said outlet,
  (g) said second mentioned fluid directing means being disposed to direct fluid through a portion of said filter element disposed above the level of fluid in said filter chamber, (h) a vane assembly secured to the exterior surface of said filter element and comprising a plurality of annularly spaced axially extending vane elements, said vane elements sealingly engaging said inner wall at each side of said second flow directing means to define a plurality of separated compartments sealed from each other and against said inner wall except in an area adjacent said inlet and adjacent said second fluid flow directing means and thereby constructed to convey the separated solid to the area of said second flow directing means.

2. The filter device as defined in claim 1 and in which said limiting means comprises
(a) said housing defining a spill chamber adapted for connection to a fluid reservoir,
(b) a vertically extending wall portion separating said spill chamber from said filter chamber.

3. The filter device as defined in claim 1 and including,
(a) said housing forming a passage connected with the upper portion of said filter chamber by an inlet opening,
(b) said second mentioned fluid directing means being disposed to direct fluid into said passage through said inlet opening.

4. The filter device as defined in claim 3 and including a nozzle adapted for connection to a source of fluid under pressure and being carried by said housing to discharge in said passage downstream from said inlet opening.

5. A continuous filter device for filtering solids from liquids, said device comprising:
(a) a filter housing having an inner wall defining a substantially cylindrical and substantially closed filter chamber and said housing having an inlet and an outlet opening to said filter chamber,
(b) a substantially cylindrical filter element disposed in said filter chamber intermediate said inlet and said outlet,
(c) means directing fluid from said inlet radially inwardly through said filter element and axially through said filter element to said outlet,
(d) means rotating said filter element on a horizontal axis,
(e) means disposed within said filter element for directing a second flow of fluid from the interior thereof radially outwardly through said filter element,
(f) means limiting the level of fluid within said filter chamber to a level covering only a portion of said filter element,
(g) said filter element being disposed in said filter chamber to change the portion of said filter element above the level of fluid in said filter chamber upon said filter element being rotated,
(h) said second fluid directing means being disposed to direct fluid through a portion of said filter element disposed above the level of fluid in said filter chamber, and
(i) a vane assembly secured to the exterior surface of said filter element and comprising a plurality of annularly spaced axially extending vane elements, said vane elements sealingly engaging said inner wall at each side of said second flow directing means to define a plurality of separated compartments sealed from each other and against said inner wall except in an area adjacent said inlet and adjacent said second fluid flow directing means and thereby constructed to convey the separated solid to the area of said second flow directing means.

References Cited

UNITED STATES PATENTS

| | | | |
|---|---|---|---|
| 1,151,999 | 8/1915 | Bird | 210—393 |
| 1,472,934 | 11/1923 | Paull | 210—391 |
| 1,886,893 | 11/1932 | Mohr | 210—391 |
| 1,914,742 | 6/1933 | Hillier | 210—391 X |
| 2,191,122 | 2/1940 | Smelser | 210—391 |

REUBEN FRIEDMAN, *Primary Examiner.*

J. ADEE, *Assistant Examiner.*